(12) United States Patent
Cha et al.

(10) Patent No.: US 7,195,318 B2
(45) Date of Patent: Mar. 27, 2007

(54) RECLINING DEVICE OF VEHICLE SEAT

(75) Inventors: Jae-Won Cha, Kyungju-shi (KR); Myung-Jin Chang, Ulsan-shi (KR)

(73) Assignee: DAS Co., Ltd., Kyungju-Shi (KR)

( * ) Notice: Subject to any disclaimer, the term of this patent is extended or adjusted under 35 U.S.C. 154(b) by 0 days.

(21) Appl. No.: 10/976,788

(22) Filed: Nov. 1, 2004

(65) Prior Publication Data

US 2006/0091713 A1    May 4, 2006

(51) Int. Cl.
*B60N 2/02*    (2006.01)

(52) U.S. Cl. .................. 297/367; 297/366; 297/368; 297/369

(58) Field of Classification Search ........ 297/366–369; 403/359.1, 359.6
See application file for complete search history.

(56) References Cited

U.S. PATENT DOCUMENTS

| | | | | |
|---|---|---|---|---|
| 5,586,833 A | * | 12/1996 | Vossmann et al. | ........ 403/359.6 |
| 5,622,407 A | * | 4/1997 | Yamada et al. | ............. 297/366 |
| 5,685,611 A | * | 11/1997 | Eguchi et al. | ............. 297/367 |
| 5,749,624 A | * | 5/1998 | Yoshida | ....................... 297/367 |
| 5,762,400 A | * | 6/1998 | Okazaki et al. | ............. 297/367 |
| 5,785,386 A | * | 7/1998 | Yoshida | ....................... 297/367 |
| 5,788,330 A | * | 8/1998 | Ryan | ..................... 297/378.12 |
| 5,816,656 A | * | 10/1998 | Hoshihara et al. | .......... 297/367 |
| 6,023,994 A | * | 2/2000 | Yoshida | ........................ 74/530 |
| 6,024,410 A | * | 2/2000 | Yoshida | .................. 297/301.1 |
| 6,620,050 B2 | * | 9/2003 | Park | ........................... 464/162 |
| 6,634,713 B2 | * | 10/2003 | Nonomiya et al. | ......... 297/367 |
| 6,733,077 B2 | * | 5/2004 | Asano | .......................... 297/367 |
| 6,910,737 B2 | * | 6/2005 | Hosokawa | ................... 297/362 |
| 2003/0178879 A1 | * | 9/2003 | Uramichi | ..................... 297/367 |

* cited by examiner

*Primary Examiner*—Peter M. Cuomo
*Assistant Examiner*—Erika Garrett
(74) *Attorney, Agent, or Firm*—Lowe Hauptman & Berner LLP

(57) ABSTRACT

A reclining device of a vehicle seat for easily locking and releasing the vehicle seat so as to increase performance of the vehicle seat and to improve quality thereof. The reclining device is easily assembled, by removing minor shortcomings that may occur during the assembly process, and enhances engagement of the locking teeth with the upper teeth when the reclining device is installed to a vehicle, so that the convenience as well as quality, strength, and durability of the reclining device are enhanced.

16 Claims, 19 Drawing Sheets

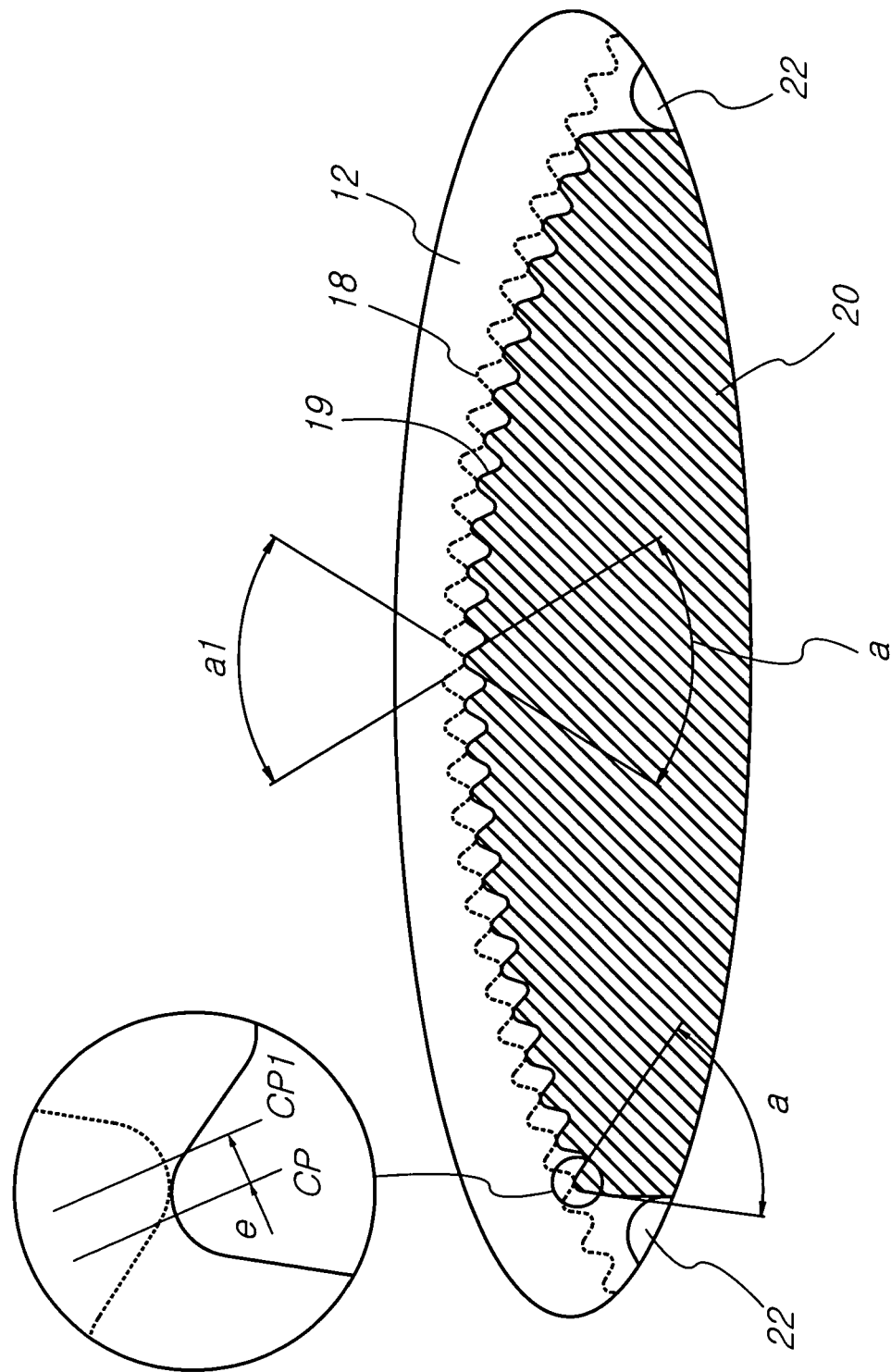

RECLINING DEVICE OF VEHICLE SEAT

BACKGROUND OF THE INVENTION

1. Field of the Invention

The present invention relates to a reclining device of a vehicle seat, and more particularly to a reclining device of a vehicle seat for easily locking and releasing the vehicle seat so as to increase operating power of the vehicle seat and to improve quality thereof.

2. Description of the Related Art

A vehicle seat serves to maintain a passenger's position within the vehicle, and includes a reclining device for adjusting the inclination of the seatback by tilting the seatback to suit a driver's and the passenger's desires, so that the driver can maintain a comfortable position when driving the vehicle.

The reclining device adjusts the inclination of the seatback by manipulating a laterally protruded lever which is installed to a connecting part between a cushion frame and seatback frame of the vehicle seat.

The conventional reclining device will be described in connection with FIGS. 17 to 19 as follows.

The conventional reclining device 10, includes a lower plate 11 fixed to an inner end of the cushion frame of the vehicle seat, an upper plate 12 fixed to a lower side of the seatback frame, and an actuating means having an actuator 13 coupled to the outer side of the lower plate 11, a recliner shaft 14, an actuating lever, and a lever spring.

The actuator 13 includes a lock gear 20 inserted between the lower plate 11 and the upper plate 12. The lock gear 20 is formed with lock teeth 19 at the outer side thereof, which are engaged/disengaged with upper teeth 18 of the upper plate 12, so that the passenger can selectively recline or lock the seat in place.

A cam 21 is coupled to the recliner shaft 14, and pushes the lock gear 20 to engage the upper teeth 18 with the locking teeth 19. The lock gear 20 is easily slid by a lock guide 22 integrally formed with the lower plate 11.

To maintain the engagement of the upper teeth 18 with the locking teeth 19 or disengagement of the locking teeth 19 from the upper teeth 18, the lock gear 20 is formed with a locking recess 23, at the inner periphery thereof, and the cam 21 is formed with a locking protrusion 24 at the outer periphery thereof. The locking recess 23 and the locking protrusion 24 are engaged or disengaged with each other.

In the above-described conventional reclining device 10, considerable stress is exerted on the upper portion of the lock guide 22 when locking or releasing the upper teeth 18 with or from the locking teeth 19 for locking or reclining the seatback.

The lock guide 22 of the reclining device 10 has a linear side, like the lock gear 20, which contacts the lock gear 20 and has approximately the same length L as the length L1 of the lock gear 20.

In the above-mentioned reclining device 10, since the excessive, concentrated stress cannot be distributed, fatigue is increased when stress is repeatedly concentrated, so that the lock guide may be damaged or separated from the lower plate, resulting in failure of the above-described reclining device 10.

Further, since the locking protrusion 24 pushes the locking teeth 19 to engage them with the upper teeth 18, thus supporting only a lower spot P of the lock gear 20, and since its supporting position is shifted from the center CL of the lock gear 20 to the side, it is difficult to maintain exact engagement of the locking teeth 19 with the upper teeth 18.

Since the upper teeth and the locking teeth have the same shape and are arranged at the same interval, the locking teeth 19 formed at the sides of the lock gear 20 are not engaged with the upper teeth 18, and thus deviate therefrom. Thus, it is difficult to stably maintain the engagement of the locking teeth 19 with the upper teeth 18.

Since the tooth angle of the locking teeth 19 is symmetrical to the tooth angle of the upper teeth 18, the central point CP of the locking teeth 19 gradually deviates from the central point CP1 of the upper teeth 18 when approaching the lateral ends, so that a shift e occurs between the central point CP and the central point CP1.

As described above, in the event that the shift e occurs between the locking teeth 19 and the upper teeth 18, the reclining device is not self-locked. Occasionally, in the event that the reclining device is installed to the vehicle, since there are minute tolerances between the parts during the assembly of the reclining device, the locking teeth 19 are not smoothly engaged with the upper teeth 18. Thus, the quality and durability of the reclining device are remarkably deteriorated.

SUMMARY OF THE INVENTION

Therefore, the present invention has been made in view of the above problems, and it is an object of the present invention to provide a reclining device, that is easily assembled, by removing minor shortcomings that may occur during the assembly process and enhances engagement of the locking teeth with the upper teeth when the reclining device is installed to a vehicle, so that the convenience as well as quality, strength, and durability of the reclining device are enhanced.

BRIEF DESCRIPTION OF THE DRAWINGS

These and/or other objects and advantages of the present invention will become apparent and more readily appreciated from the following description of the embodiments, taken in conjunction with the accompanying drawings, in which:

FIG. 19 is an enlarged cross-sectional view illustrating the locking teeth and the upper teeth of a conventional reclining device of a vehicle seat.

DESCRIPTION OF THE PREFERRED EMBODIMENTS

Hereinafter, the structure and operation of a reclining device of a vehicle seat according to the preferred embodiment of the present invention will be described in detail in conjunction with the accompanying drawing.

Figure 1:
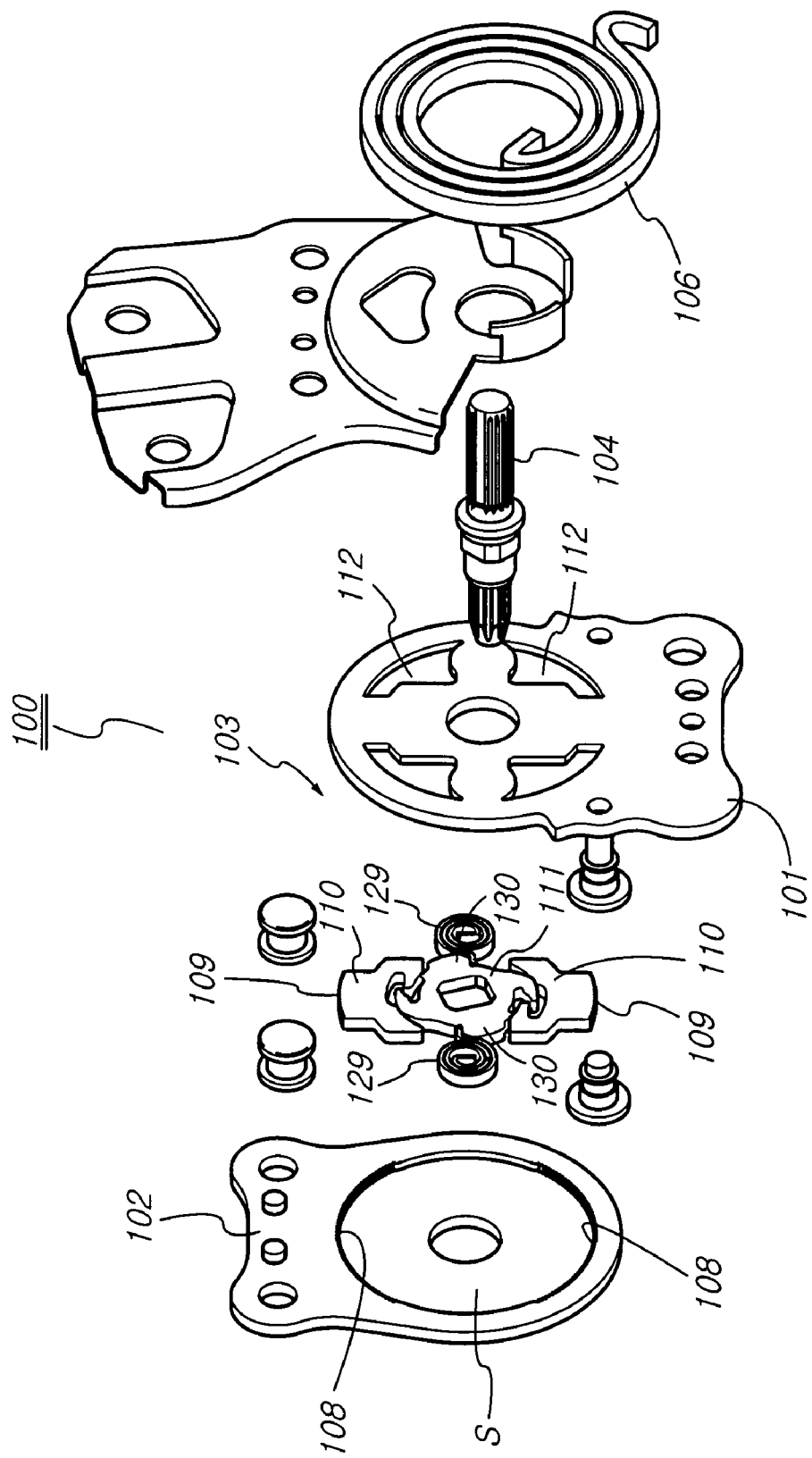
FIG. 1 is an exploded perspective view illustrating a reclining device of a vehicle seat according to the present invention.
Figure 2:
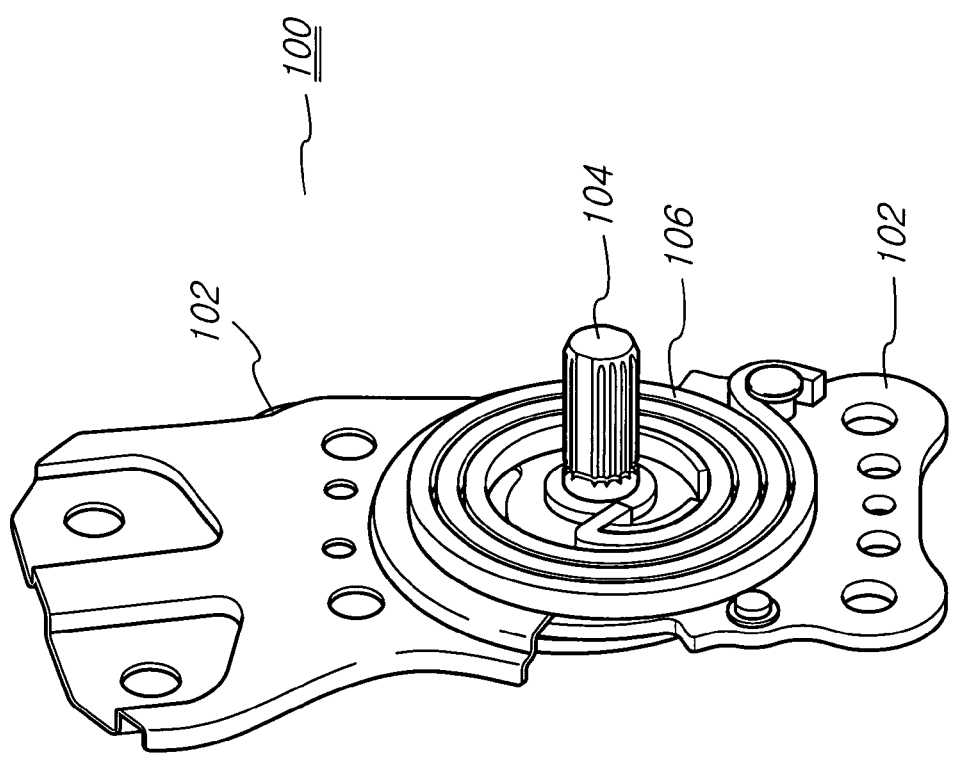
FIG. 2 is a perspective view illustrating an assembled reclining device of a vehicle seat according to the present invention.
Figure 3:
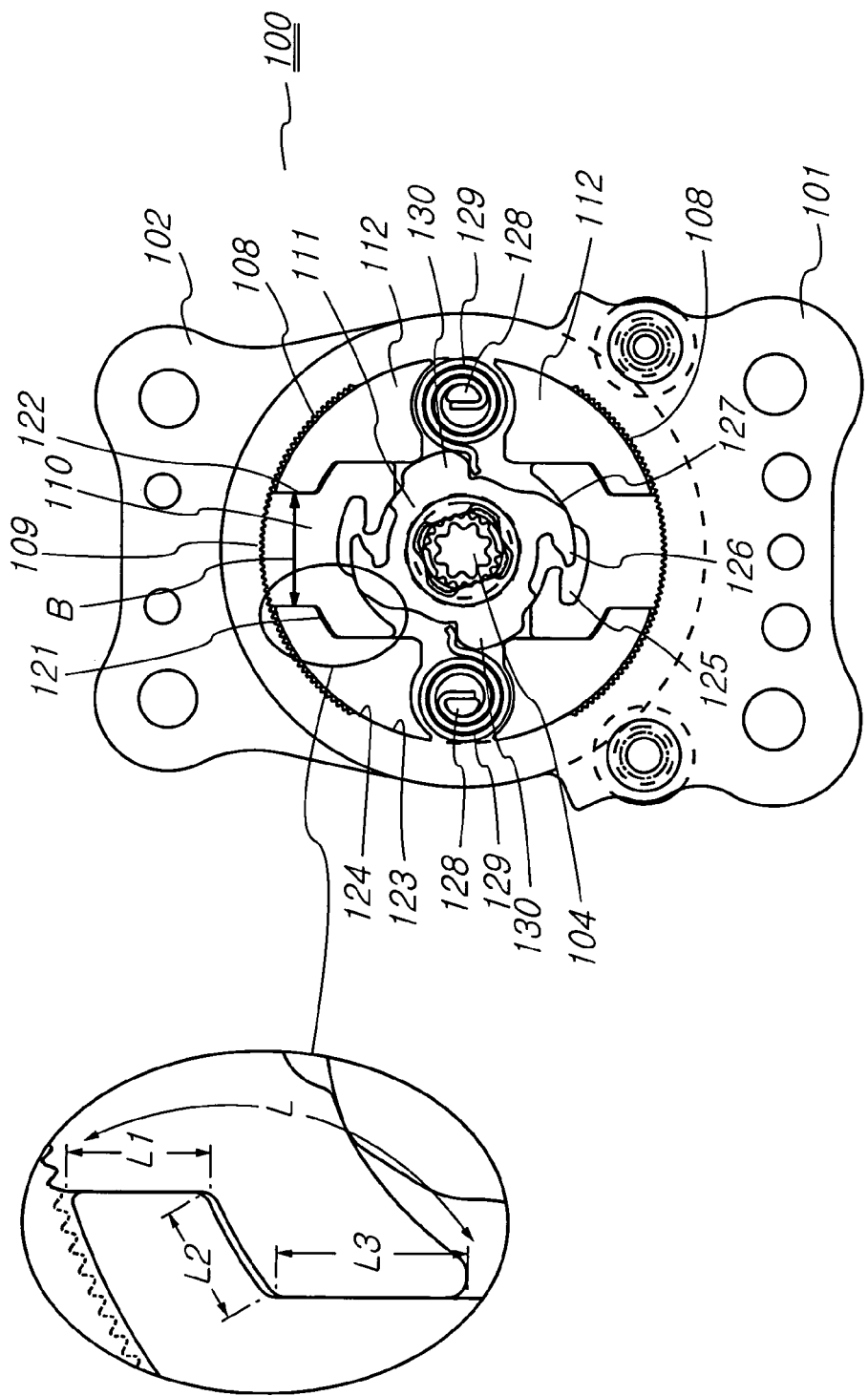
FIG. 3 is a front view illustrating the interior of a reclining device of a vehicle seat according to the present invention.
Figure 4:
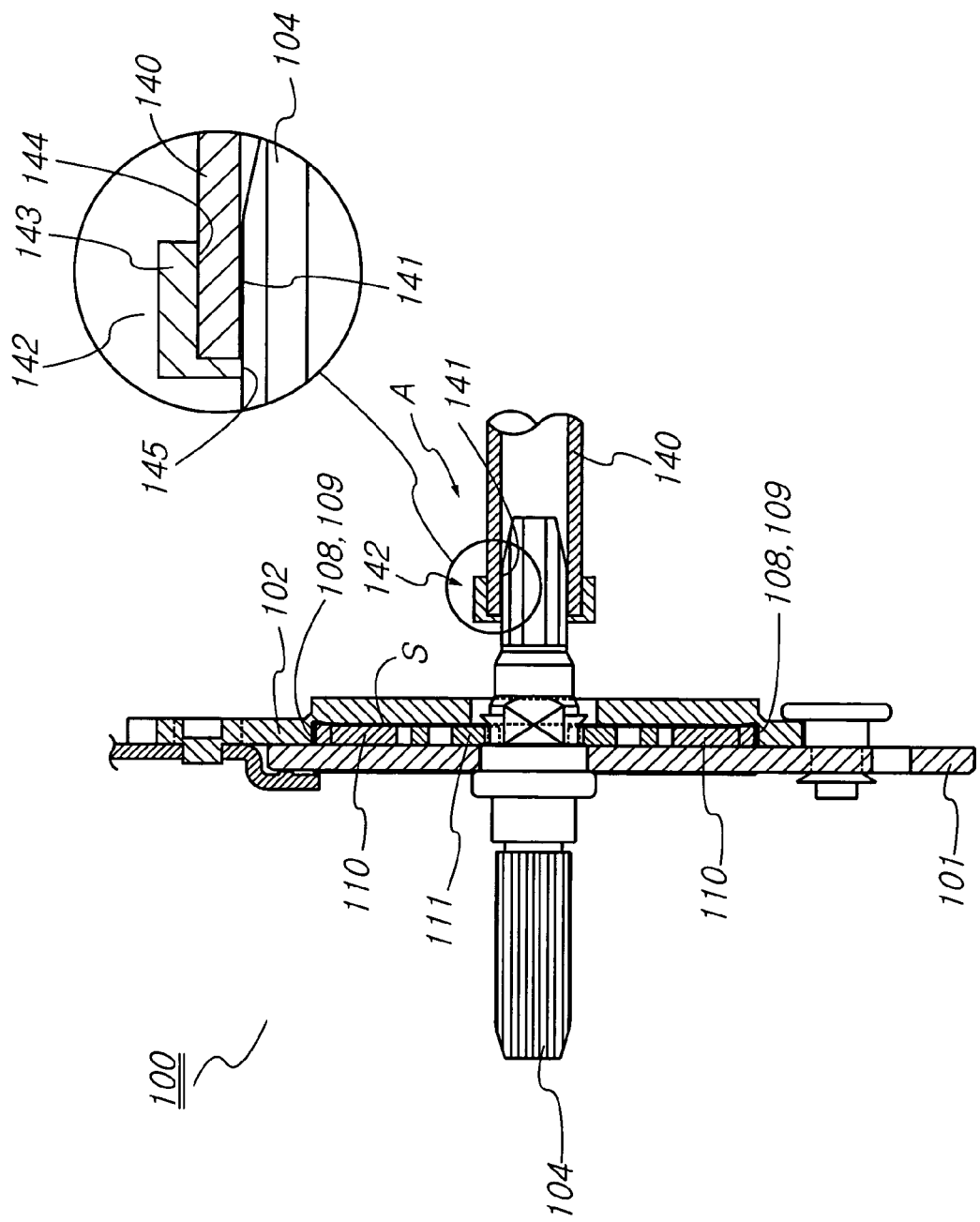
FIG. 4 is a side cross-sectional view illustrating a reclining device of a vehicle seat according to the present invention.

FIG. 1 is an exploded perspective view illustrating a reclining device of a vehicle seat according to the present invention, FIG. 2 is a perspective view illustrating an assembled reclining device of a vehicle seat, FIG. 3 is a front view illustrating the interior of the reclining device, and FIG. 4 is a side cross-sectional view illustrating the reclining device of a vehicle seat according to the present invention.

A conventional reclining device 100 of a vehicle seat includes a lower plate 101 fixed to an inner end of a cushion frame of a vehicle seat, and an upper plate 102 fixed to a lower end of a seatback frame.

The conventional reclining device further includes an actuator 103, disposed in a space S between the lower plate 101 and the upper plate 102, for substantially performing the reclining, and an actuating unit, which is coupled to the outer side of the lower plate 101, and includes a recliner shaft 104, an actuating lever, and a lever spring 106.

The actuator 103 includes a lock gear 110 formed with locking teeth 109 at the outer side thereof, so that the reclining function or the locking function can be selected by the engagement or disengagement of the locking teeth 109 with or from the upper teeth 108.

The actuator 103 further includes a cam 111, coupled to the recliner shaft 104, for pushing the lock gears 110 so as to engage the locking teeth 109 with the upper teeth 108. The lock gear 110 is easily slid by a lock guide 112 integrally formed with the lower plate 101.

The lock gears 110 and the cam 111 include a locking means for maintaining the engagement of the locking teeth 109 with the upper teeth 108 and disengaging the locking teeth 109 from the upper teeth 108.

According to the reclining device of a vehicle seat of the present invention, the locking device and components related to the locking device are improved so that the self-locking of the locking teeth to the upper teeth during the assembly process, as well as locking and releasing during reclining, are easily performed.

The reclining device of a vehicle seat according to the preferred embodiment of the present invention will be described in great detail with reference to the accompanying drawings.

Figure 5:
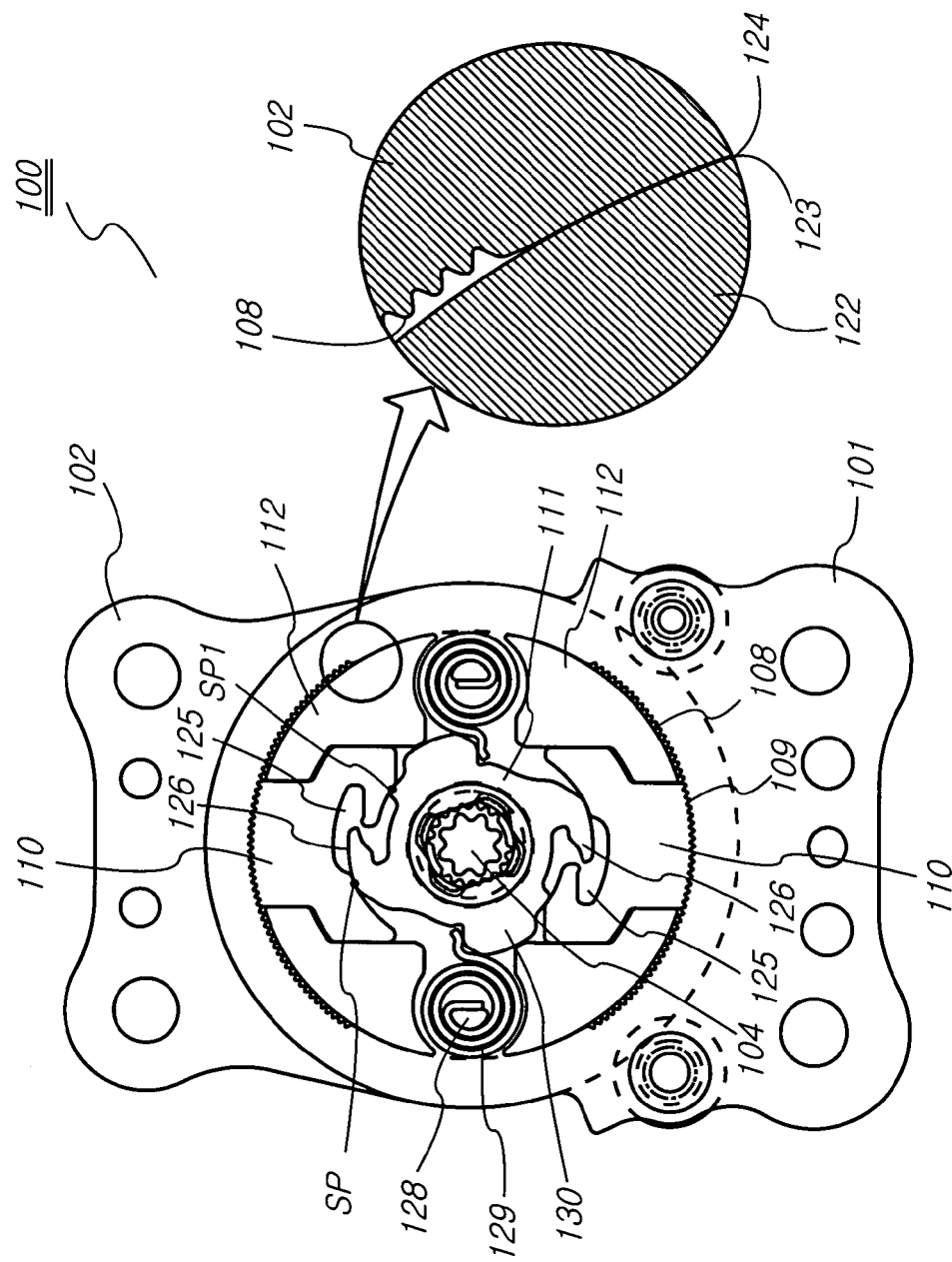
FIG. 5 is a view illustrating a lock guide of a reclining device of a vehicle seat according to the present invention.
Figure 6:
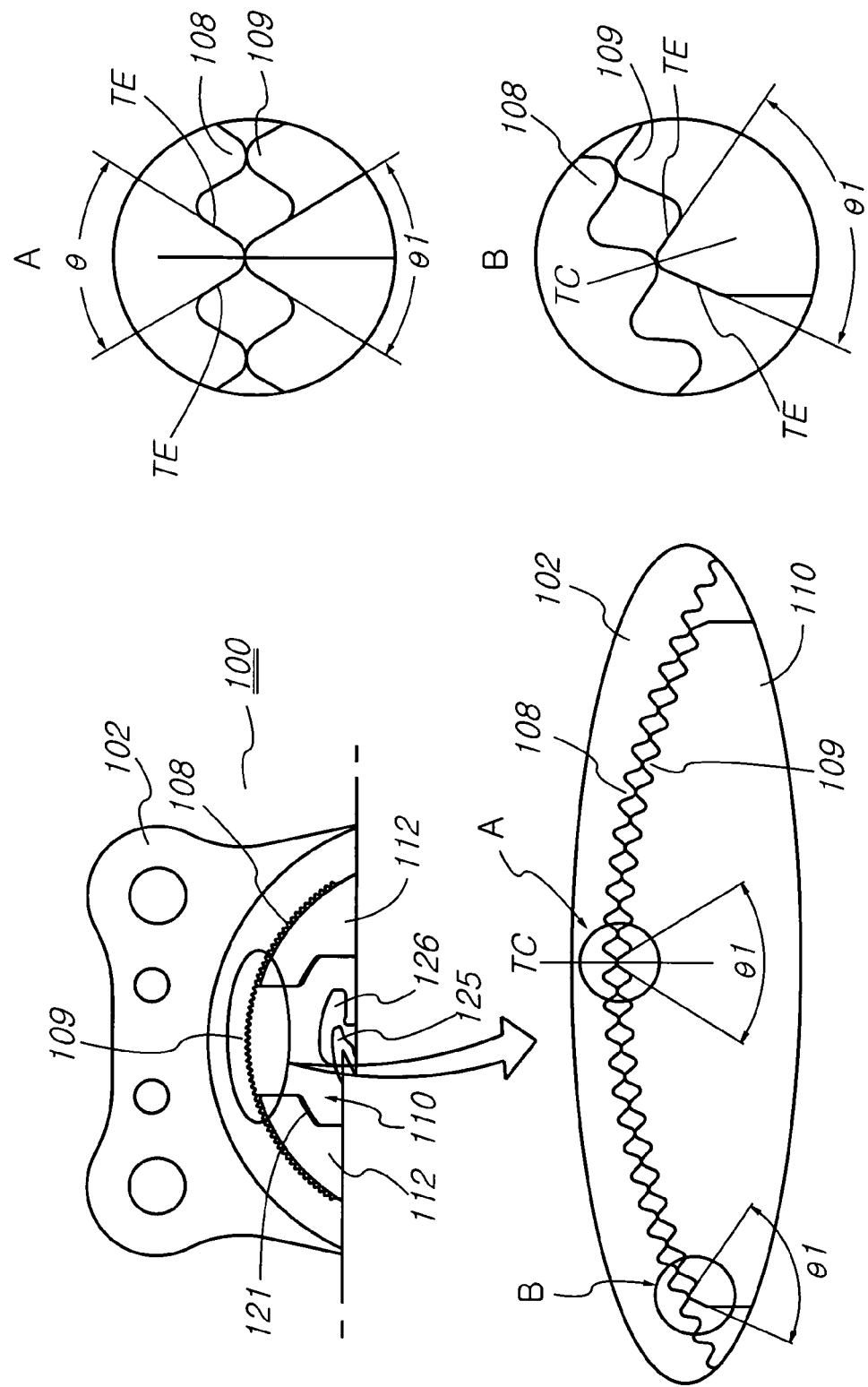
FIG. 6 is a partially enlarged cross-sectional view of the locking teeth and the upper teeth of a reclining device of a vehicle seat in FIG. 3, in which A illustrates the center of the locking teeth and B illustrates sides of the locking teeth.
Figure 7:
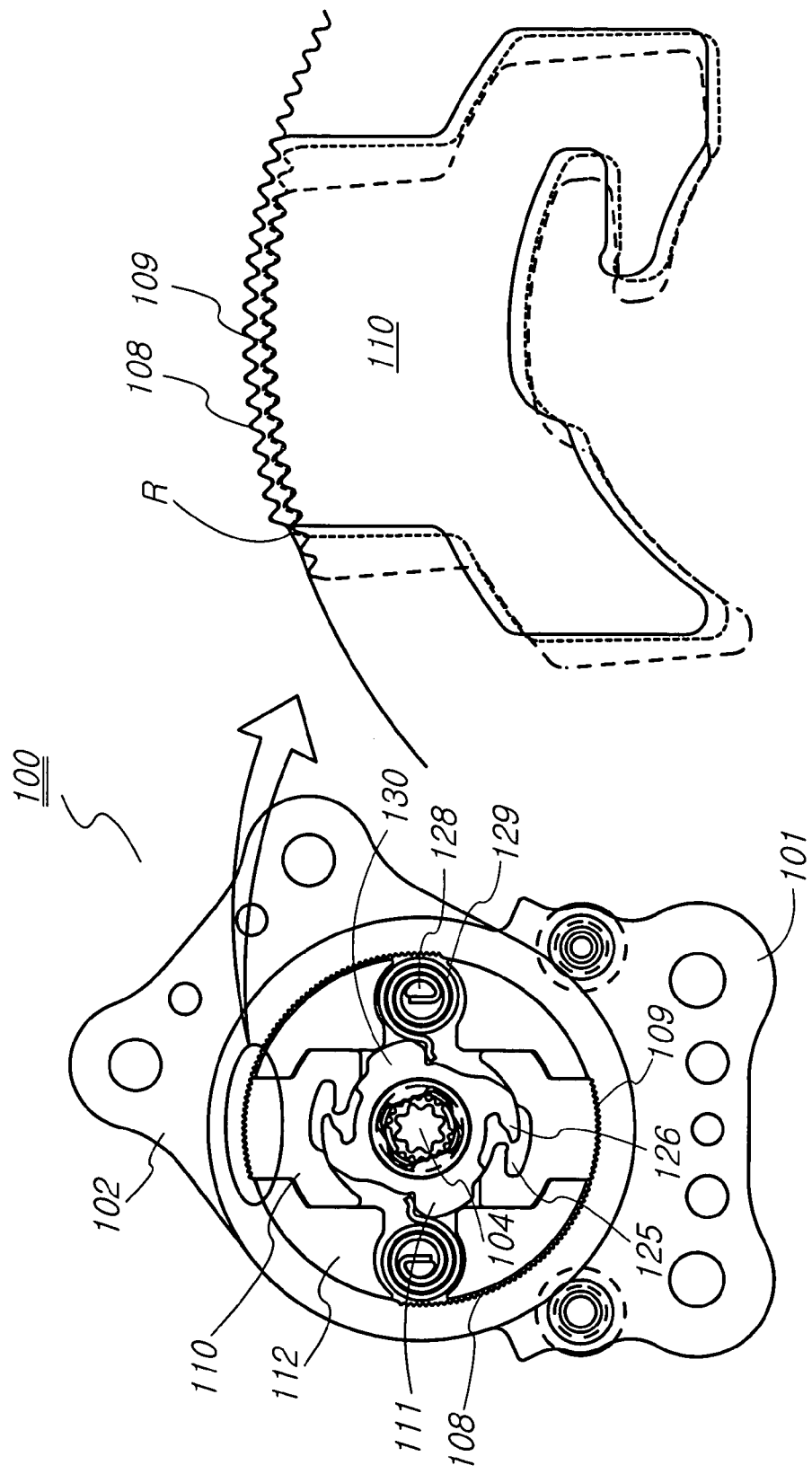
FIG. 7 is a view illustrating guiding of a lock gear from the released position to an initial locking position in a reclining device of a vehicle seat according to the present invention.
Figure 8:
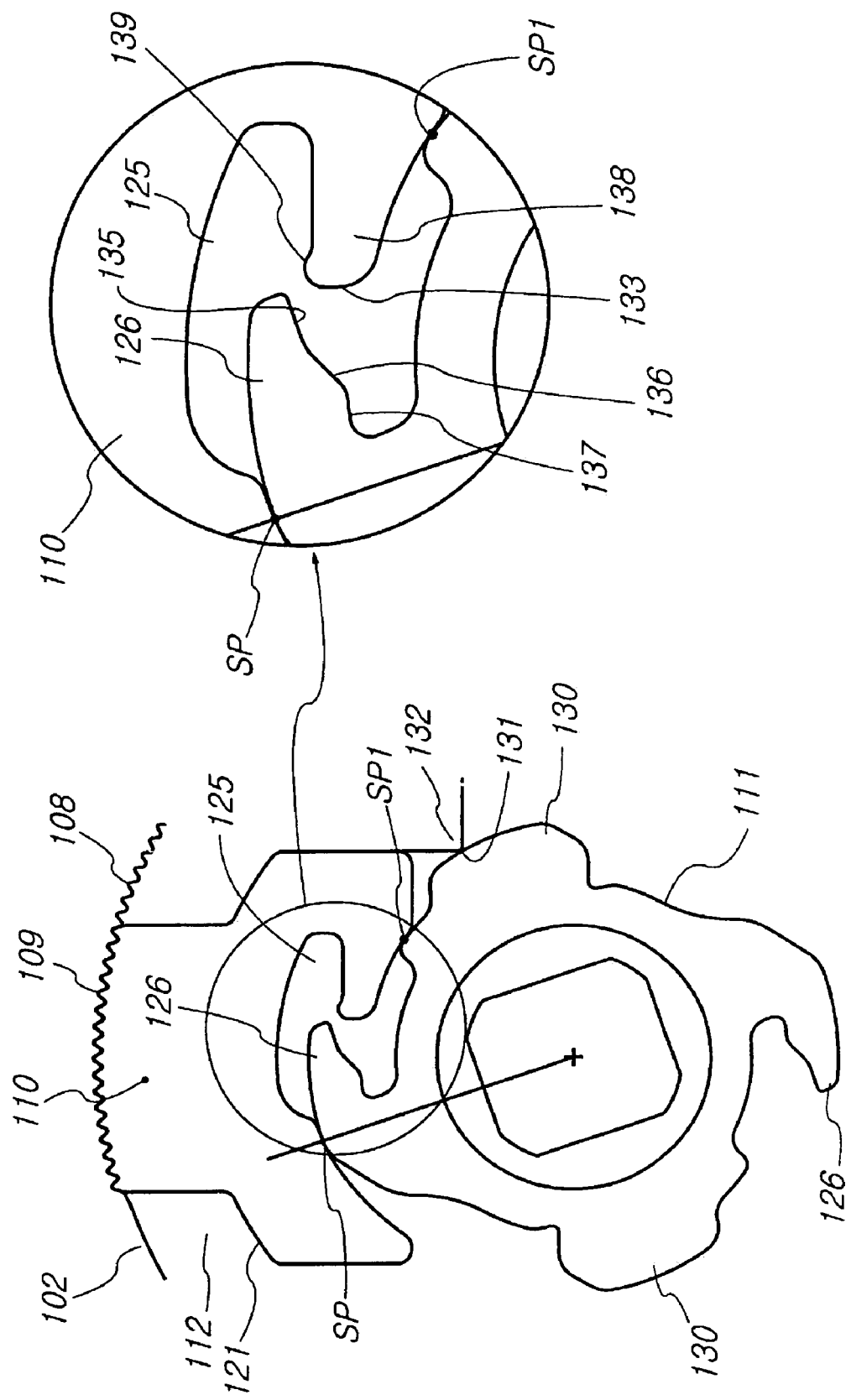
FIG. 8 is an enlarged view illustrating locking of a lock gear to upper teeth of a reclining device of a vehicle seat according to the present invention.
Figure 9:
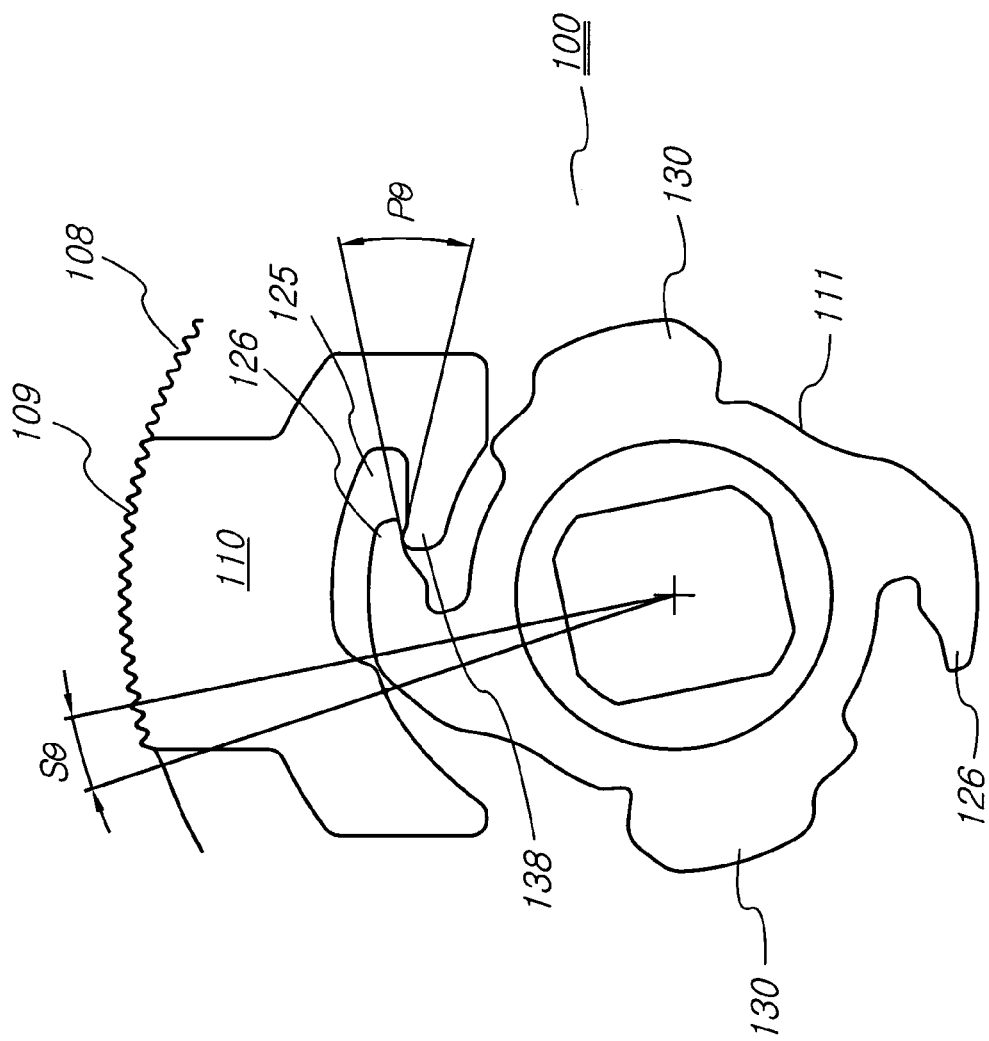
FIG. 9 is an enlarged view illustrating initial disengagement of a lock gear from upper teeth of a reclining device of a vehicle seat according to the present invention.
Figure 10:
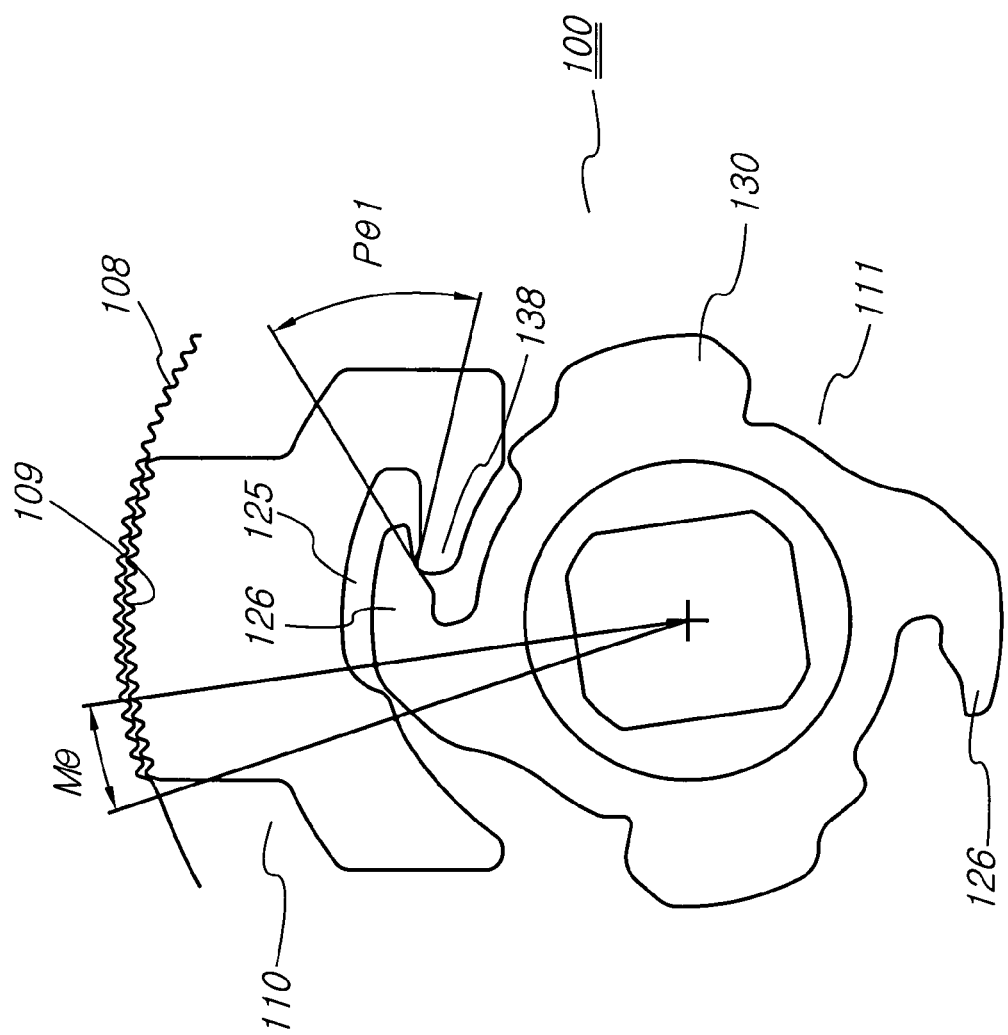
FIG. 10 is an enlarged view illustrating intermediate the engagement of a lock gear with upper teeth of a reclining device of a vehicle seat according to the present invention.
Figure 11:
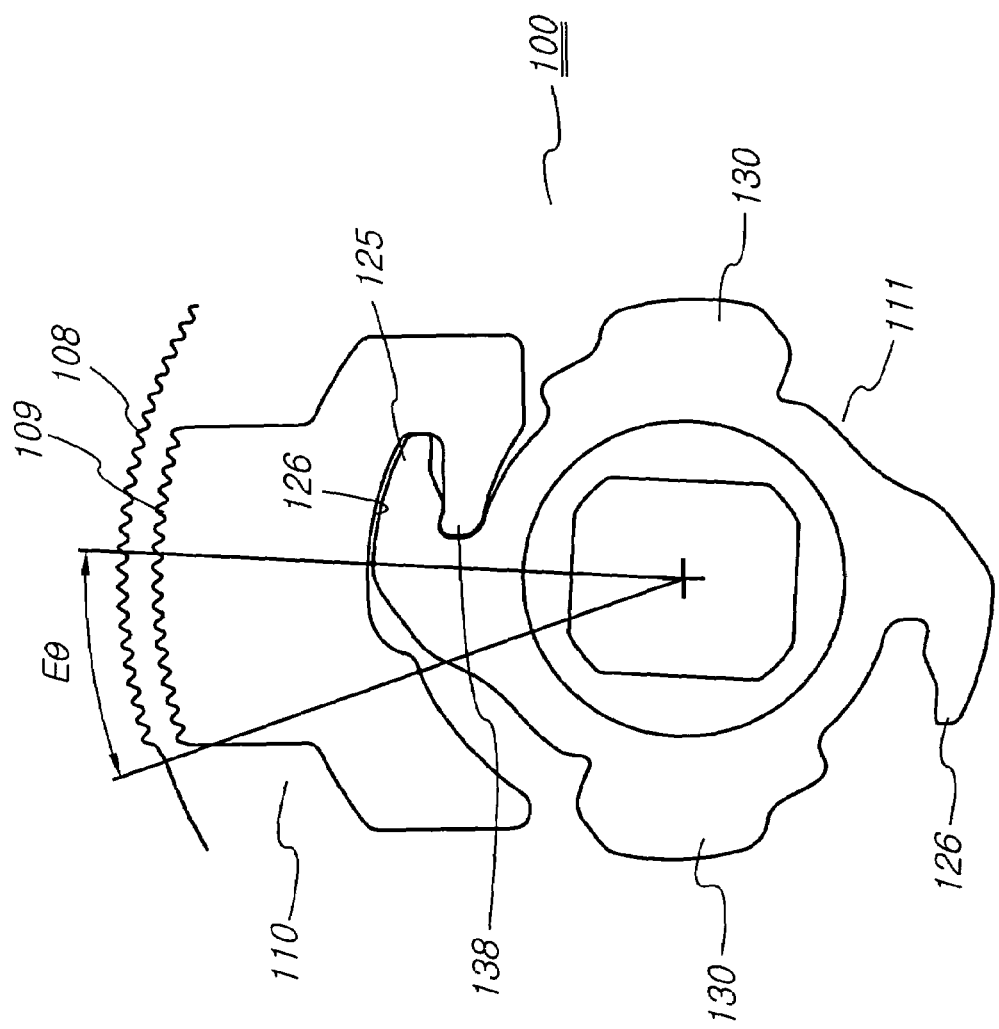
FIG. 11 is an enlarged view illustrating a full disengagement of a lock gear from upper teeth of a reclining device of a vehicle seat according to the present invention.
Figure 12:
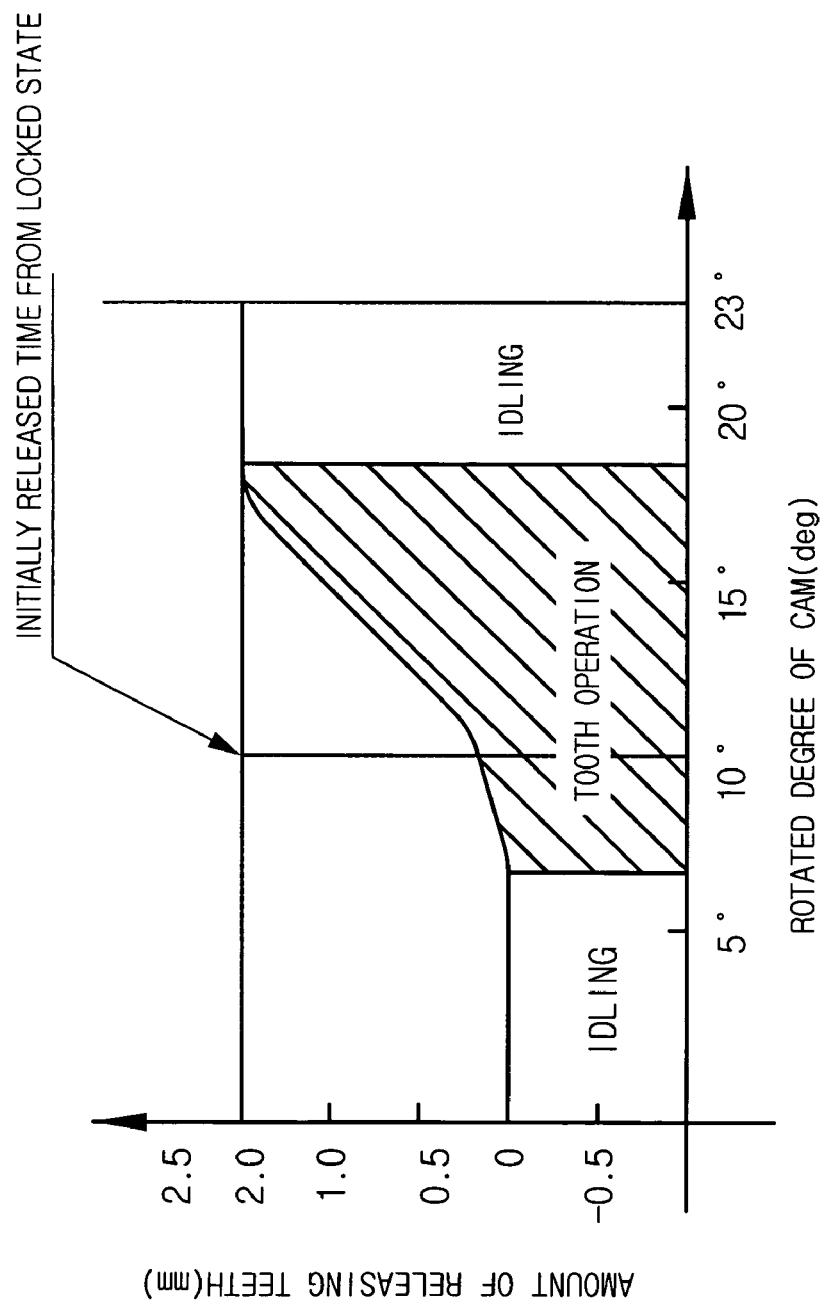
FIG. 12 is a graph illustrating disengagement of a lock gear of a reclining device of a vehicle seat according to the present invention.
Figure 13:
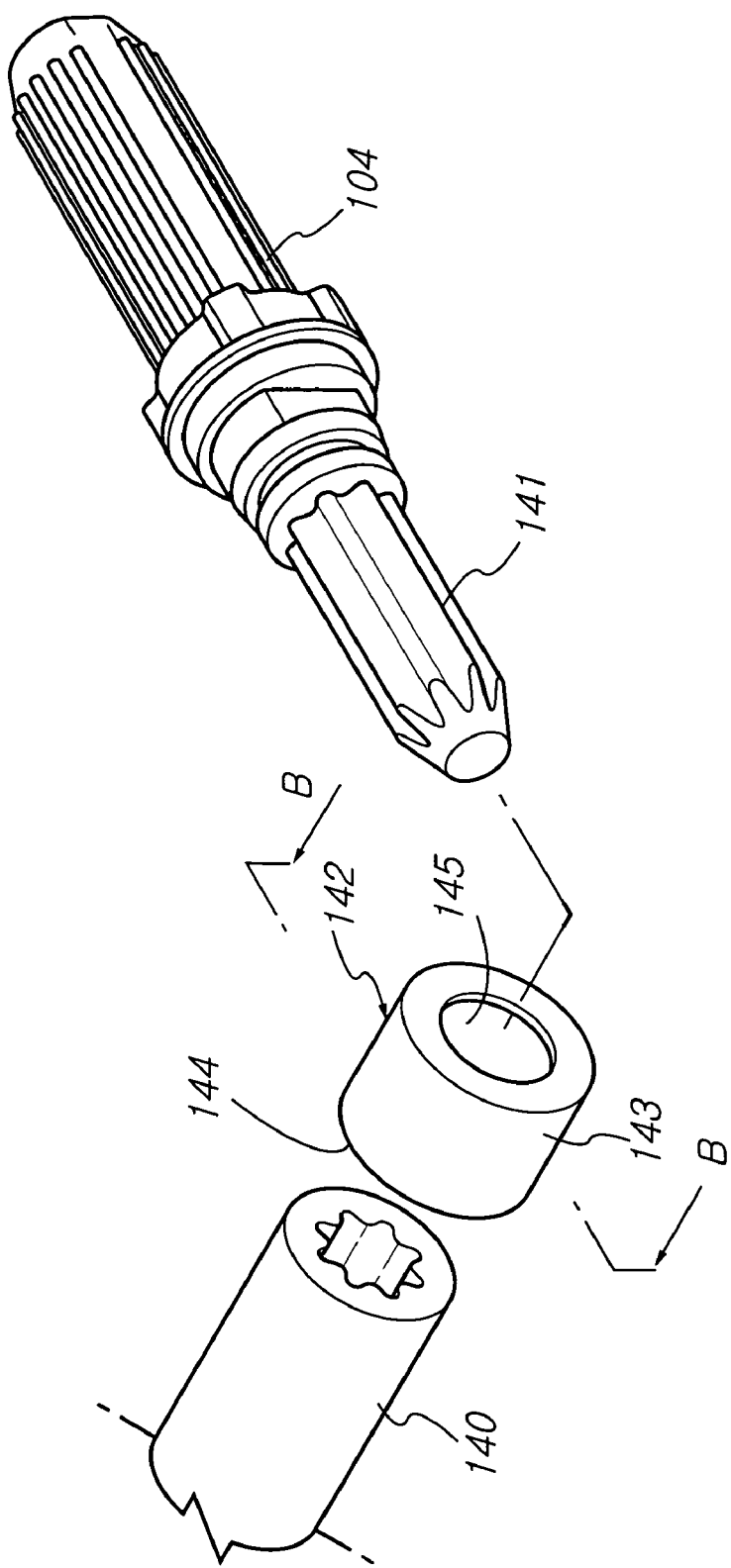
FIG. 13 is an exploded perspective view illustrating assembly of a recliner shaft with a connector pipe of a reclining device of a vehicle seat according to the present invention depicted in portion A of FIG. 4.
Figure 14:
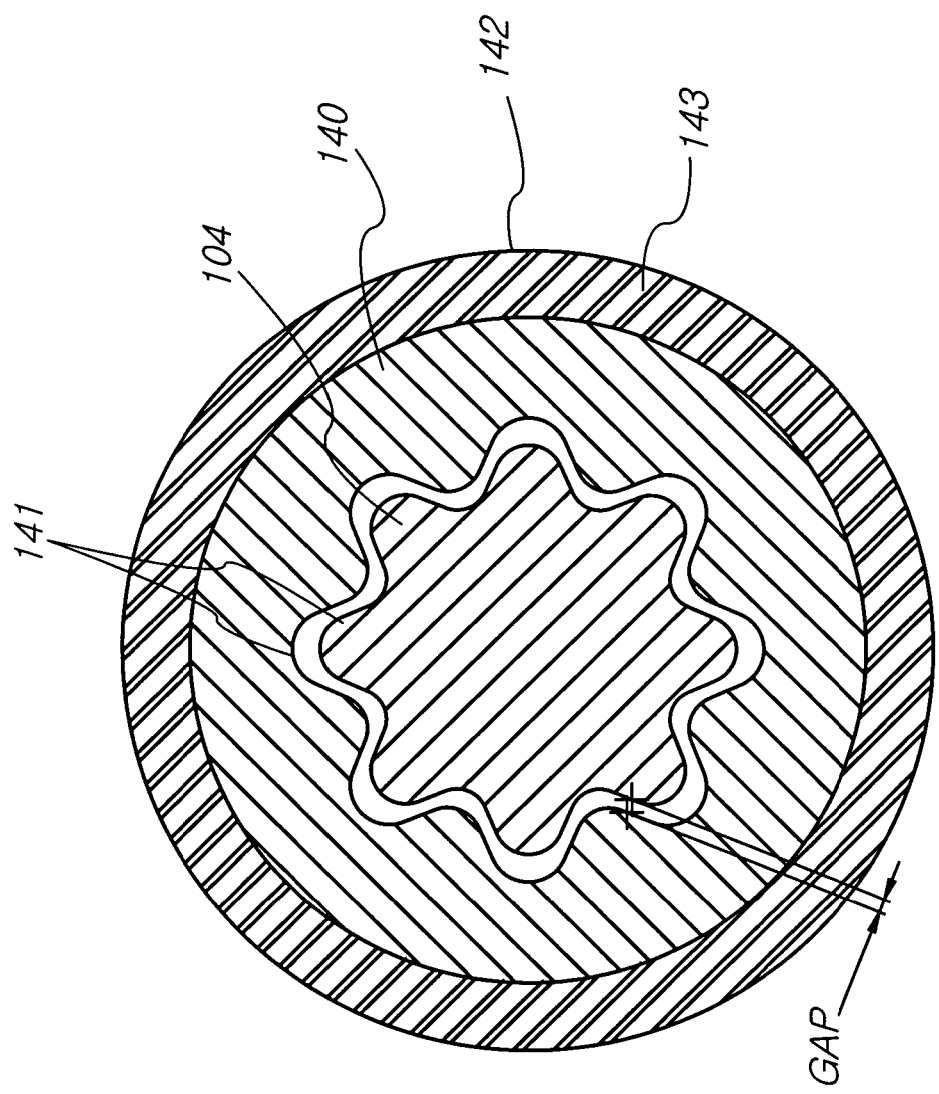
FIG. 14 is a cross-sectional view illustrating assembly a holder used to overcome assembly tolerance, taken along the line B—B in FIG. 13.

FIG. 5 is a view illustrating a lock guide of a reclining device of a vehicle seat according to the present invention, FIG. 6 is a partially enlarged cross-sectional view of the locking teeth and the upper teeth of the reclining device of a vehicle seat in FIG. 3, in which A illustrates the center of the locking teeth and B illustrates sides of the locking teeth, FIG. 7 is a view illustrating guiding of the lock gear from a releasing position to an initial locking position, FIG. 8 is an enlarge view illustrating locking of the lock gear to the upper teeth, FIG. 9 is an enlarged view illustrating initial disengagement of the lock gear with the upper teeth, FIG. 10 is an enlarged view illustrating intermediate engagement of the lock gear with upper teeth, FIG. 11 is an enlarged view illustrating full disengagement of the lock gear from the upper teeth, FIG. 12 is a graph illustrating the disengagement of the lock gear, FIG. 13 is an exploded perspective view illustrating assembly of a recliner shaft with a connector pipe of the reclining device of a vehicle seat according to the present invention depicted in portion A of FIG. 4, FIG. 14 is a cross-sectional view illustrating assembly of a holder used to overcome assembly tolerance, taken along the line B—B in FIG. 13.

According to the improvement of the locking device of the reclining device of a vehicle seat of the present invention, since excessive stress, generated when the locking teeth 109 of the lock gear 110 are engaged with the upper teeth 108 of the upper plate 102, is easily distributed, damage or deformation of the lock guide 112 can be prevented so that the lock gear 110 is stably guided and supported.

Upwardly inclined slopes 121 are formed at the inner intermediate surface of the lock guide 112 and the outer intermediate surface of the lock gear 110. The upper side of the lock gear 110 is reduced to have the same width B as that of the lock guide 112.

Since the overall length L of the lock gear 110 and the lock guide 112 becomes equal to the sum of the length L1 of the upper lateral side, the length L2 of the slope 121, and the length L3 of a lower lateral side of the lock gear 110, the length of the guide surface of the lock guide 112 is maximized so as to distribute the stress.

More especially, since the stress, concentrated to the upper side of the lock gear 110 and the lock guide 112, is uniformly distributed over all of the slope 121 and the upper side 122, stress can be prevented from being concentrated on a specific portion.

An outer surface of the lock guide 112 makes contact with an inner surface 124, without the upper teeth 108, of the upper plate 102 so as to serve as a hinge guide when the upper plate 102 is rotated. Thus, the lock guide 112 prevents the upper plate 102 from being moved. As a result, the locking force of the locking teeth 109 to be engaged with the upper teeth 108 can be increased.

The locking teeth 109 of the lock gear 110 are asymmetrically formed so as to increase the locking force of the locking teeth 108 by preventing or minimizing the deviation of a teeth center TC of the locking teeth 109 from the upper teeth 108.

In order to achieve this, each of the locking teeth 109, formed at a center line of the lock gear 110, has a face angle $\theta 1$ symmetrical to a face angle $\theta$ of the face TE of an upper tooth 108. Meanwhile, the nearer to the sides of the lock gear 110 the locking teeth are, the larger the face angle $\theta 1$ is. As a result, the lock gear 110 is made of an asymmetric gear.

Ends, where the upper teeth 108 of the upper plate 102 are terminated, are formed with rounds R so that the locking teeth 109 of the locking gear 110 easily advance toward the upper teeth 108, and are preferably sloped in the direction toward the upper teeth 108.

The lock gear 100 is formed with a release recess 125 at a lower side thereof, and the cam 111 coupled to the recliner shaft 104 is provided with a release protrusion 126, while the release recess 125 and the release protrusion serve as a locking and releasing means and are shaped to engage with each other.

The release recess 125 is formed with an arc-shaped guide recess 127 at one side thereof, so that a left lower side of the lock gear 110 is supported by a main supporting point SP where the guide recess 127 makes contact with the upper side (the left upper side as seen in the drawing) of the release protrusion 126 protruded from the cam 111. Simultaneously, the right lower side of the lock gear 110 is supported by an auxiliary point SP1 where a protruded portion, opposite to the release protrusion 126, of the cam 111 makes contact with the lock gear 110, so that the lock gear 110 can be stably supported so as not to be shifted in any direction.

The cam 111 is formed with spring pins 130 at sides thereof. The spring pins 130 contact one end of the return springs 129 for returning the cam 111. The other ends of the return springs 129 are hooked by spring pins 130 formed at the lower plate 102. By making the spring pins 130 larger, outer sides of the spring pins 130 make contact with a lower end of the lock guide 112 so as to prevent the cam 111 from being moved.

Each of the release protrusions 126 is formed with a slightly inclined initial operating surface 135 at a lower surface thereof. The initial operative surface 135 generates considerable torque upon initial release so as to easily separate the lock gears 110 firmly engaged with the upper teeth 108.

The initial operative surface 135 is formed with intermediate operative surface 136 with a slope larger than that of the initial operative surface 135, at a lower side of the initial operative surface 135. A final operative surface 137 is formed at a lower side of the intermediate operative surface 136 so as to fully separate the lock gear 110.

The initial operative surface 135, the intermediate operative surface 136, and the final operative surface 137 make contact with a frictional tip 133 having a linear portion 139 so as to lower the lock gear 110 to be released. The linear portion 139 is rounded and downwardly inclined to minimize friction and formed at the operating protrusion 138, protruded from the lower side of the release recess 125 of the lock gear 110 toward the release protrusion 126.

The initial release angle S$\theta$, defined when the frictional tip 133 makes contact with the initial operating surface 135, is an angle defined by movement of the main supporting point SP due to the rotation of the cam 111, and is about 7 degrees.

Preferably, a pressure angle P$\theta$, formed by the linear portion 139 of the frictional tip 133 and the initial operative surface 135, is maintained as small as possible, so that large rotational torque of the cam 111 can be exerted to separate the locking teeth 109 from the upper teeth 108 easily.

Moreover, an intermediate release angle ME, defined by The contact of the frictional tip 133 and the intermediate operative surface 136, is increased no more than the initial angle and is maintained at about 10 degrees including the initial release angle S$\theta$. At this time, a pressure angle P$\theta 1$ defined by the linear portion 139 and the intermediate operative surface 136 is maintained at an angle larger than the pressure angle P$\theta$ defined by the linear portion 139 and the initial operative surface 135 so as to widen the movement range (degree of the separation of the lock gear 110) of the lock gear 110 when a small torque is exerted.

Preferably, the release angle E$\theta$, defined when the lock gear 110 is fully separated due to the above-mentioned movement, is maintained below 23 degrees so that a user can easily use the actuating lever by decreasing the actuating angle of the actuating lever.

Splines 141, formed at the connector pipe 140, for connecting the recliner shaft 104 to the connector pipe 140, and for actuating the same, further include a holder 142 made of urethane, rubber, or the like, so that vibration or noise, due to the assembly tolerance GAP caused by dimensional tolerance, can be prevented.

The holder 142 has a hollow cylindrical holding body 143. The holding body 143 is formed with a pipe inserting hole 144, at one side thereof, in which one end of the connector pipe 140 is tightly fitted.

The holding body 143 is formed with a spline hole 145, at the other side thereof, in which the spline 141 of the recliner shaft 104 is tightly fitted, so that the movement of the recliner shaft 104 and the connector pipe 140, and the associated noise can be prevented.

Hereinafter, the operation of the reclining device 100 according to the present invention will be described.

In the initial state, since the locking teeth 109 of the lock gear 110, located in the space S between the lower plate 101 and the upper plate 102, are engaged with the upper teeth 108 of the upper plate 102, the upper plate 102 is not rotated about the recliner shaft 104.

This is due to the fact that the cam 111, for restricting the movement of the lock gear 110, pushes the lock gear 110 to prevent it from moving, while the cam 111 is connected to the actuating lever maintained in its original state by the lever spring 106 and the return spring 129.

The lock gear 110 is stably supported at two lower points by the main supporting point SP and the auxiliary supporting point SP1. The main supporting point SP is defined by the contact of the upper side protruded from the release protrusion 126 of the cam 111 with the guide recess 127 formed at the entrance of the release recess 125. The auxiliary supporting point SP1 is defined at a position opposite to the main supporting point SP by the contact of a portion, protruded from the cam 111 opposite to the release protrusion 126, with the lock gear 110.

Therefore, since the locking teeth 109 of the lock gear 110 and the upper teeth 108 of the upper plate 102 are stably engaged, the lock gear 110 can be prevented from being shifted.

Moreover, since the lock guide 112 and the lock gear 110, integrally formed at the lower plate 101, are configured in a multi-step pattern having the slope 121, the overall length L of the lock guide 112 is maximized to distribute the stress transmitted through the lock gear 110.

In this state, when actuating the actuating lever upward in order to recline the seatback, the recliner shaft 104 connected to the actuating lever is rotated in the direction of the movement of the actuating lever, and the cam 11 connected to the recliner shaft 104 is also rotated.

By the rotation of the cam 111, the release protrusion 126, integrally formed with the cam 111, slowly advances into the release recess 125 of the lock gear 110 starting from the state of supporting the lock gear 110.

When the engaged locking teeth 109 and upper teeth 108 are separated from each other, thus pulling the lock gear 110 as the release protrusion 126 advances into the release recess 125, the angle of the seatback is smoothly adjustable in a desired direction and the reclining is performed.

When the upper plate 102 is rotated for the purpose of reclining, as described above, the outer surface of the lock guide 112 of the lower plate 101 serves as a hinge by making contact with the inner circumferential surface 124, without the upper teeth 108, of the upper plate 102, so that more stable operation is possible.

The separation of the lock gear 110, due to the engagement of the release protrusion 126 with the release recess 125, will be described. First, by pulling the actuating lever, the cam 111 fixed to the recliner shaft 104 moves.

During this process, the release protrusion 126 is deviated from the main supporting point SP, supporting the arc-shaped guide recess 127 formed the outer side of the release recess 125, and the initial operative surface 135, formed at the lower side of the release protrusion 126, makes contact with the frictional tip 133 of the operating protrusion 138 at the lower side of the release recess 125.

In this state, when further actuating the actuating lever, the initial operative surface 135 presses the frictional tip 133 so as to separate the engaged locking teeth 109 and upper teeth 108.

Since the pressure angle Pθ, defined by the initial operative surface 135 and the linear portion 139 of the frictional tip 133, is small when the initial operative surface 135 presses the frictional tip 133, a considerable torque is transmitted so that the locking teeth 109 can be easily separated from the upper teeth 108.

By continuously actuating the actuating lever, since the frictional tip 133 comes into contact with the intermediate operative surface 136, having a considerable slope, the frictional tip can move much within a short interval so that the lock gear 110 is almost separated.

Since the lock gear can be moved much by a smaller torque due to the pressure angle Pθ1, defined by the intermediate operative surface 136 and the linear portion 139 of the frictional tip 133, the lock gear 110 can be rapidly separated.

As such, when the release protrusion 126 is fully engaged with the release recess 125 by the sequential actions of the actuating lever in the state of almost separating the lock gear 110, the separation of the lock gear 110 is finished and reclining may be performed as described above.

During this process, although the release protrusion 126 is moved by a small degree by a large torque in the initial state due to the improved structure thereof, the lock gear 110 is moved much by applying a smaller torque when the locking teeth 109 is separated from the upper teeth 108. As a result, the manipulating angle (release angle; Eθ) of the actuating lever is minimized (about 23 degrees) so that no additional action is necessary.

When the recliner shaft 104 is moved by the actuating lever as described above, the recliner shaft 104 provided at the opposite (inner) recliner is connected to the connector pipe 104 and the two actuated are together.

When the recliner shaft 104 is connected to the connector pipe 140, an assembly tolerance GAP between the connector pipe 140 and the recliner shaft 104 occurs, due to the dimensional tolerance of the spline 141 of the connector pipe 140. The rubber or urethane holder 142 prevents noise caused by the clearance or friction between the recliner shaft 104 and the connector pipe 140 due to the assembly tolerance GAP.

If the actuating lever, having been pulled when the seat back was rotated to a desired position as described above is released, the actuating lever is returned to its original position by the restorative force of the compressed lever spring 106 and return spring 129.

Then, the recliner shaft 104 is rotated in the opposite direction, and the cam 111 connected to the recliner shaft 104 is also rotated in the opposite direction, so that the release protrusion 126 inserted in the release recess 125 is returned to its initial position. Thus, the lock gear 110 is stably locked to be supported by the two points, the main supporting point SP and the auxiliary supporting point SP1.

Since the locking tooth 109 at the center line of the lock gear 110 has the face angle θ1, symmetrical to the face angle θ of the upper teeth 108, the center of the locking teeth 109 is aligned with the tooth center TC of the upper teeth when the locking teeth 109 are engaged with or disengaged from the upper teeth 108 by the movement of the lock gear 110 due to the cam 111 as described above.

Further, the nearer to the sides of the lock gear 110 the locking teeth are, the larger the face angle θ1 is. As a result, the face angle θ1 of the locking teeth 108 is asymmetrical to the face angle θ of the upper teeth 109, so that all locking teeth 108 are nearly perfectly aligned with the teeth center TC of the upper teeth 108. Thus, the engagement between the locking teeth 109 and the upper teeth 108 can be improved.

Figure 15:
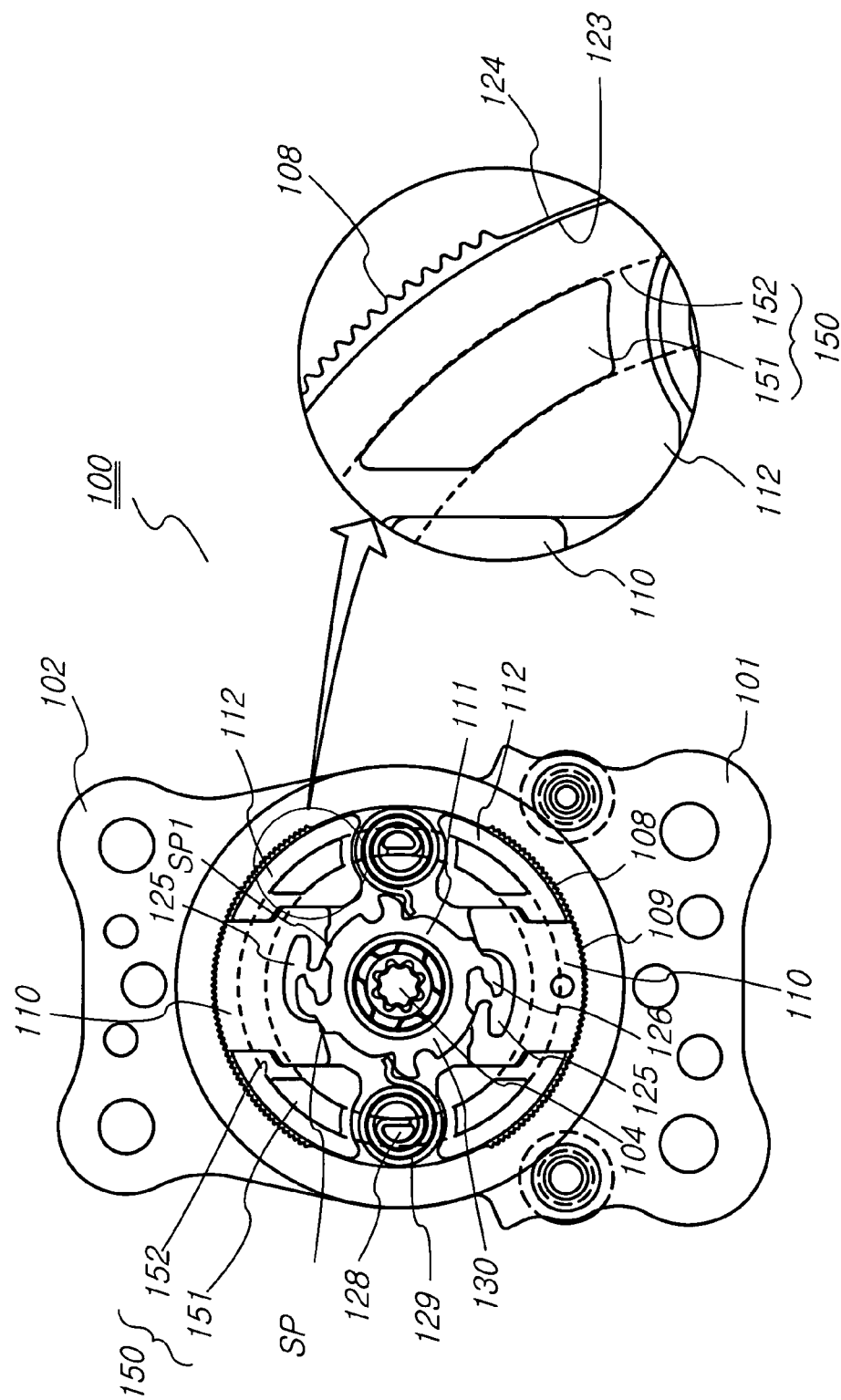
FIG. 15 is a front view illustrating the interior of a reclining device of a vehicle seat according to another embodiment of the present invention.
Figure 16:
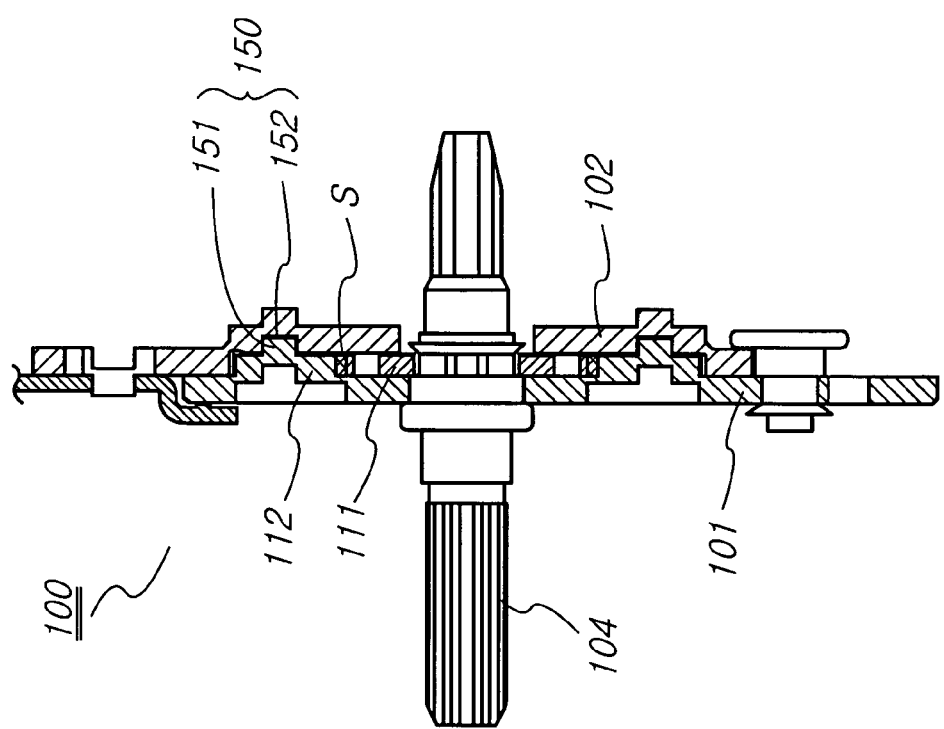
FIG. 16 is a side cross-sectional view illustrating a reclining device of a vehicle seat according another embodiment of the present invention.
Figure 17:
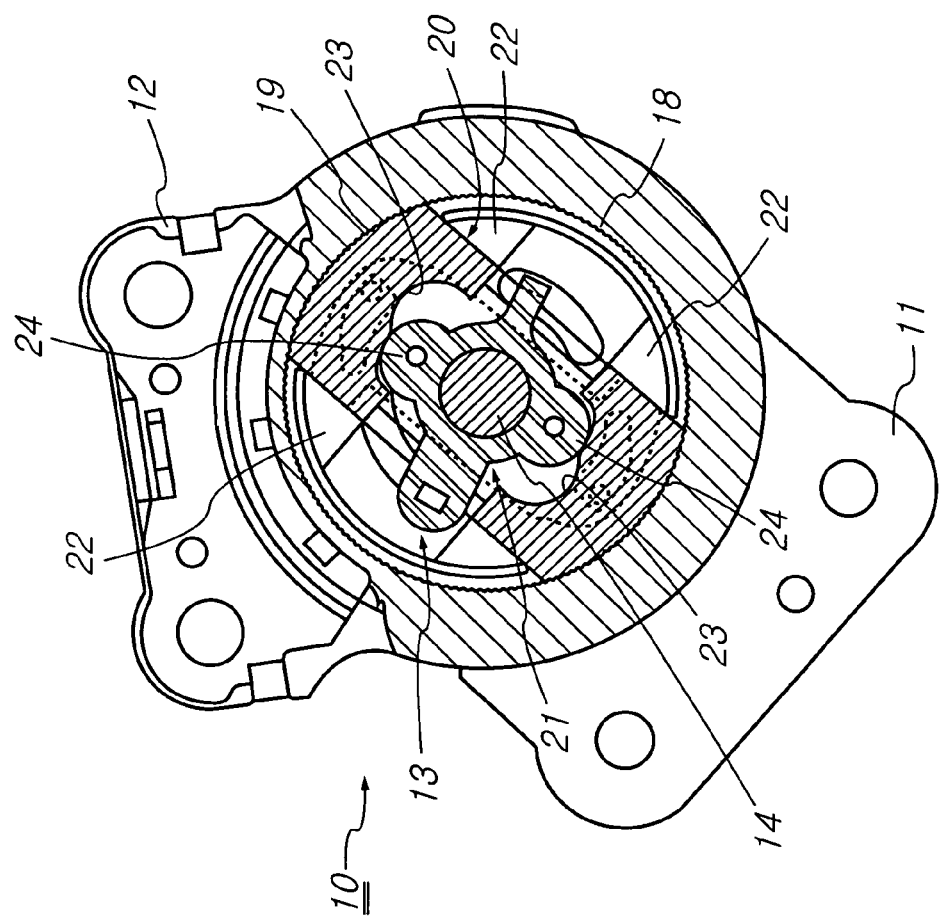
FIG. 17 is a front view illustrating the interior of a conventional reclining device of a vehicle seat.
Figure 18:
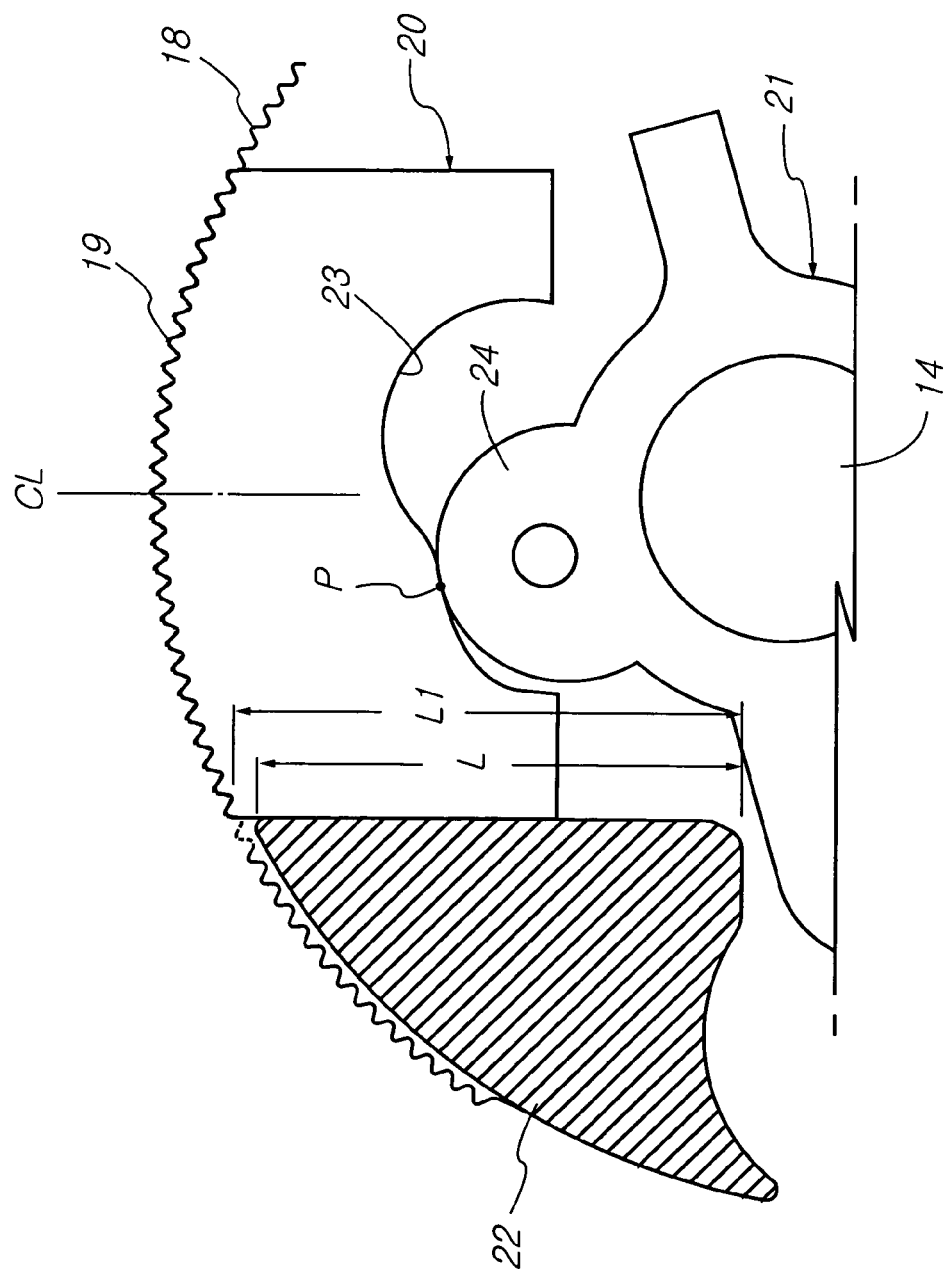
FIG. 18 is a view illustrating a lock guide of a conventional reclining device of a vehicle seat.

FIG. 15 is a front view illustrating the interior of the reclining device of a vehicle seat according another embodiment of the present invention, and FIG. 16 is a side cross-sectional view illustrating the reclining device of a vehicle seat according another embodiment of the present invention.

The reclining device 100 of a vehicle seat according to another embodiment of the present invention further includes a hinge guide 150 disposed in a space S between the lock guide 112 and the upper plate 102 so as to enhance the engagement force of the upper teeth 108 of the seat back bracket with the locking teeth 109.

The hinge guide 150 has a hinge protrusion 151 protruded from a central portion of the lock guide 112 toward the space S and a circular hinge recess 152 formed in the space S of the upper plate 102.

At this time, the outer circumferential surface 123 does not make contact with the inner circumferential surface 124 of the upper plate 102.

As described above, the hinge guide 150 is provided to the upper plate 102 having the upper teeth 108 and the lock guide 112 so that the engagement force of the upper teeth 108 of the upper plate 102 with the locking teeth 109 of the lock gear 110 is increased. Thus, the reclining force is improved.

The reclining device according to the present invention, selectively performs reclining function or locking function when the release protrusion 126 of the cam 111 enters or exits the release recess 125 of the lock gear 110. The reclining device according to the present invention, in comparison with the conventional reclining device of a vehicle seat, is also convenient to manipulate by minimizing the assembly tolerance, or the like.

According to the reclining device of the present invention, it is easily assembled, by removing minor shortcomings that may occur during the assembly process and enhances engagement of the locking teeth with the upper teeth even in the state that the reclining device is installed to a vehicle, so that the convenience as well as quality, strength, and durability of the reclining device are enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reclining device of a vehicle seat comprising:
   a lower plate fixed to an inner end of a cushion frame of the vehicle seat;
   an upper plate fixed to a lower end of a seat back;
   an actuator disposed in a space between the lower plate and the upper plate;
   a recliner shaft, an actuating lever, and a lever spring serving as an actuating means, and coupled to an outer side of the lower plate; and
   the actuator including:
      a lock gear having locking teeth engaged with upper teeth formed at the upper plate;
      a cam coupled to a recliner shaft to push the lock gear to engage the upper teeth with the locking teeth;
      a lock guide, integrally formed with the lower plate, for guiding the lock gear;
      a locking means, disposed to the lock gear and the cam, for maintaining the engagement of the upper teeth with the locking teeth and for separating the upper teeth from the locking teeth;
   a locking and releasing means having a release recess formed at a lower side of the lock gear, and a release protrusion formed at the cam coupled to the recliner shaft, the release recess and the release protrusion being engaged with each other;
   a lower side of the lock gear stably supported by a main supporting point, defined by which an arc-shaped guide recess at one side of the release recess makes contact with an upper side of the release protrusion of the cam, and an auxiliary supporting point, defined by which the lock gear make contact with a protruded portion, opposite to the release protrusion, of the cam;
   a lower side of the release protrusion including:
      an initial operative surface, having a slope, for generating a considerable torque in an initial state to easily separate the lock gear firmly engaged with the upper teeth;
      an intermediate operative surface formed at a lower side of the initial operative surface and having a larger slope than the initial operative surface;
      a final operative surface, formed at a lower side of the intermediate operative surface, for fully separating the lock gear;
   the initial operative surface, the intermediate operative surface, and the final operative surface making contact with an actuating protrusion, protruded from a lower side of the release recess of the lock gear to the release protrusion, to lower and release the lock gear, wherein the actuating protrusion includes a frictional tip, formed at one end of the actuating protrusion, and having a short linear portion downwardly inclined and rounded to minimize friction.

2. The reclining device of a vehicle seat as set forth in claim 1, wherein the lower plate is formed with a first spring pin, to which one end of a return spring is connected and the cam is formed with a second spring pin to which the other end of the return spring is connected, the return spring returns the cam to its original position, and an outer side of the second spring pin makes contact with the lower side of the lock guide to prevent the movement of the cam in the locked state.

3. The reclining device of a vehicle seat as set forth in claim 1, wherein the lock guide has an upwardly inclined slope formed at an intermediate inner position of the lock guide making contact with the lock guide,
   an upper side of the lock gear is decreased in width to have the same shape as the shape of the lock guide, and the overall length of the lock gear and the lock guide is equal to the sum of the lengths of the lower side, the slope, and the lower side of the lock gear to distribute stress by maximizing the length of the lock guide.

4. The reclining device of a vehicle seat as set forth in claim 1, wherein an outer side of the lock guide serves as a hinge guide of a seatback of the vehicle, when the upper plate is rotated, to make contact with an inner circumferential surface of the upper plate without the upper teeth Previously Presented to prevent the movement of the upper plate.

5. The reclining device of a vehicle seat as set forth in claim 1, wherein a locking tooth, formed at the center line of the lock gear, has a face angle symmetrical to a face angle of the face of the upper tooth, and the locking teeth of the lock gear are asymmetrically formed to increase the locking force of the locking teeth by preventing or minimizing the deviation of a teeth center of the locking teeth from the upper teeth.

6. The reclining device of a vehicle seat as set forth in claim 1, wherein sides of the upper plate, where the upper teeth are not formed, is rounded so that the locking teeth of the lock gear are easily advanced.

7. The reclining device of a vehicle seat as set forth in claim 1, wherein sides of the upper plate, where the upper teeth are not formed, have slopes formed toward the upper teeth so that the locking teeth of the lock gear are easily advanced.

8. The reclining device of a vehicle seat as set forth in claim 1, further comprising a holder for preventing vibration and noise caused by an assembly tolerance at a spline, formed at a connector pipe, for connecting and actuating a recliner opposite to a recliner shaft.

9. The reclining device of a vehicle seat as set forth in claim 8, wherein the holder comprises:
   a hollow cylindrical holding body;
   a pipe inserting hole, formed at one side of the holding body, in which one end of the connector pipe is tightly fitted; and
   a spline hole, formed at the other side of the holding body, in which the spline of the recliner shaft is tightly fitted.

10. The reclining device of a vehicle seat as set forth in claim 8, wherein the holder is made of an elastic material selected from the group consisting of urethane and rubber.

11. The reclining device of a vehicle seat as set forth in claim 1, wherein an initial release angle, defined when the frictional tip makes contact with the initial operating surface, is an angle defined by movement of the main supporting point due to the rotation of the cam, and is about 7 degrees.

12. The reclining device of a vehicle seat as set forth in claim 1, wherein a pressure angle, defined by the linear portion of the frictional tip and the initial operative surface, is maintained as small as possible, so that large rotational torque of the cam can be exerted to separate the locking teeth from the upper teeth easily.

13. The reclining device of a vehicle seat as set forth in claim 1, wherein an intermediate release angle, defined by the contact of the frictional tip and the intermediate operative surface, is maintained at about 10 degrees including the initial release angle.

14. The reclining device of a vehicle seat as set forth in claim 1, wherein a pressure angle defined by the linear portion and the intermediate operative surface is maintained at an angle larger than a pressure angle defined by the linear portion and the initial operative surface when the separation of the lock gear is increased by exerting a small torque.

15. The reclining device of a vehicle seat as set forth in claim 1, wherein a release angle, defined when the lock gear is fully separated, is maintained below 23 degrees so that a user can easily use an actuating lever by decreasing an actuating angle of the actuating lever.

16. The reclining device of a vehicle seat as set forth in claim 1, further comprising a hinge guide disposed in a space between the lock guide and the upper plate for increasing the engagement force of the upper teeth with the locking teeth, the hinge guide comprising:
- a hinge protrusion protruded from a central portion of the lock guide toward the space; and
- a circular hinge recess formed in the space of the upper plate, wherein
- an outer circumferential surface of the lock guide does not make contact with an inner circumferential surface of the upper plate.

* * * * *